(12) United States Patent
Goldfinger et al.

(10) Patent No.: US 7,149,775 B2
(45) Date of Patent: *Dec. 12, 2006

(54) COMMUNICATION SYSTEM ALLOWING USERS TO KNOW ONLINE OR NETWORK STATUS OF SOUGHT USERS

(75) Inventors: Yair Goldfinger, Tel Aviv (IL); Sefi Vigiser, Hod Hasharon (IL); Arieh Vardi, Tel Aviv (IL); Amir Amnon, Herzelya (IL)

(73) Assignee: ICQ, Inc., Dulles, VA (US)

( * ) Notice: Subject to any disclaimer, the term of this patent is extended or adjusted under 35 U.S.C. 154(b) by 687 days.

This patent is subject to a terminal disclaimer.

(21) Appl. No.: 10/127,463

(22) Filed: Apr. 23, 2002

(65) Prior Publication Data

US 2003/0200261 A1    Oct. 23, 2003

Related U.S. Application Data (63) Continuation of application No. 08/791,437, filed on Jan. 27, 1997, now Pat. No. 6,449,344.

(51) Int. Cl.
*G06F 13/00* (2006.01)

(52) U.S. Cl. ..................................... 709/204
(58) Field of Classification Search ................. 709/204
See application file for complete search history.

(56) References Cited

U.S. PATENT DOCUMENTS

| | | | |
|---|---|---|---|
| 4,653,090 A | 3/1987 | Hayden |
| 5,136,501 A | 8/1992 | Silverman et al. |
| 5,245,656 A | 9/1993 | Loeb et al. |
| 5,276,736 A | 1/1994 | Chaum |
| 5,327,486 A | 7/1994 | Wolff et al. |
| 5,471,525 A | 11/1995 | Domoto et al. |
| 5,483,586 A | 1/1996 | Sussman |
| 5,506,891 A | 4/1996 | Brown |
| 5,533,110 A | 7/1996 | Pinard et al. |
| 5,557,659 A | 9/1996 | Hyde-Thomson |
| 5,568,540 A | 10/1996 | Greco et al. |
| 5,583,920 A | 12/1996 | Wheeler, Jr. |
| 5,592,534 A | 1/1997 | Ito |
| 5,608,786 A | 3/1997 | Gordon |
| 5,610,910 A | 3/1997 | Focsaneanu et al. |
| 5,652,789 A | 7/1997 | Miner et al. |
| 5,726,984 A | 3/1998 | Kubler et al. |
| 5,774,668 A | 6/1998 | Choquier et al. |
| 5,790,548 A | 8/1998 | Sistanizadeh et al. |

(Continued)

FOREIGN PATENT DOCUMENTS

WO    WO 97/14234    4/1997

(Continued)

OTHER PUBLICATIONS

Finding Several Users, Jul. 14, 1994, [online], [retrieved on Jan. 27, 2003]. Retrieved from the Internet: URL:http://consult.cern.ch/writeup/zephyr/subsectionar 2_2_3_2.html.

(Continued)

*Primary Examiner*—Robert B. Harrell
(74) *Attorney, Agent, or Firm*—Nixon & Vanderhye P.C.

(57) ABSTRACT

A communication system including a multiplicity of communications terminals connectable to a communications network for enabling users to communicate with a user not necessarily identified with a given communications terminal. The system also includes apparatus for monitoring whether the user is connected to the network, and apparatus for annunciating network connection status information relating to other users who are in a set of sought users.

25 Claims, 3 Drawing Sheets

U.S. PATENT DOCUMENTS

| | | | |
|---|---|---|---|
| 5,884,032 | A | 3/1999 | Bateman et al. |
| 5,956,485 | A | 9/1999 | Perlman |
| 6,078,579 | A | 6/2000 | Weingarten |
| 6,108,704 | A | 8/2000 | Hutton et al. |
| 6,252,869 | B1 | 6/2001 | Silverman |
| 6,389,127 | B1 | 5/2002 | Vardi et al. |
| 6,449,344 | B1 * | 9/2002 | Goldfinger et al. ...... 379/88.17 |

FOREIGN PATENT DOCUMENTS

| | | |
|---|---|---|
| WO | WO 97/46955 | 12/1997 |

OTHER PUBLICATIONS

Abbe Cohen et al., Inessential Zephyr, [online], [retrieved on Jan. 28, 2003]. Retrieved from the Internet: URL:http://www.mit.edu/afs/sipb/project/doc/izephyr/html/izephyr.html.

Sharon Belville et al., Zephyr at CERN, Jul. 15, 1993, [online], [retrieved on Jan. 27, 2003]. Retrieved from the Internet: URL:http://consult.cern.ch/writeup/zephyr/main.html.

ZEPHYR Answer, [online], [retrieved on Jan. 27, 2003]. Retrieved from the Internet: URL:http://web.mit.edu/answers/zephyr/.

ZEPHYR(1) Manual Page, Jul. 1, 1998, [online], [retrieved on Jan. 27, 2003]. Retrieved from the Internet: URL:http://www.tru64unix.compaq.com/demos/ossc-v51a/man-htm/zephyr-man.htm.

Zephyr on Athena (AC-34) Draft, [online], [retrieved on Jan. 27, 2003]. Retrieved from the Internet: URL:http://web.mit.edu/olh/zephyr/TOC.html.

C. Anthony DellaFera et al., The Zephyr Notification Service, pp. 1-9.

Robert S. French et al., The Zeohyr Programmer's Manual, Protocol Version ZEPH0.2, Apr. 5, 1989, pp. 1-82.

Carla J. Fermann, Distributed Consulting in a Distributed Environment, ACM SIGUCCS XVIII 1990, pp. 117-120.

Earll M. Murman et al., Perspectives on Project Athena, ACM SIGUCCS XVIII 1990, pp. 287-296.

Keizer, Comprehensive Collaboration Comes Cheap,: CNET Reviews, Net Meeting 1.0 Beta 1 (Jul. 16, 1996), http://www.cnet.com, pp. 1-2.

Business Week, Sep. 9, 1996, p. 120, No. 3492, Journal Code: BW, Section Heading: Personal Business: ONLINE.

Internet Online Services: Communications, Supplier No. 19254182, Mooradian, Mark: Keane, Patrick, Interactive Content, vol. 2, p. 7(1) (Oct. 1996).

Profile: AOL Technology: Turning Complicated Things Into Engaging Services, 1996 Annual Report http://sunsite.doc.ic.ac.uk/public/packages//R5contrib/xhtalk-2.9.README, May 26, 1998.

Muller, N., "Dial 1-800-Internet With New Software, You can Talk Business Over the Net and Avoid Long Distance Charges," BYTE, vol. 21, No. 2 (Feb. 1, 1996), pp. 83-84, 86 and 88.

Wayne, P., Hey Bayby, Call me at my IP Address,: Byte, vol. 21, No. 4 (Apr. 1996), pp. 142-144.

\* cited by examiner

FIG. 1

COMMUNICATION SYSTEM ALLOWING USERS TO KNOW ONLINE OR NETWORK STATUS OF SOUGHT USERS

CROSS-REFERENCE TO RELATED APPLICATIONS

This application is a continuation of U.S. application Ser. No. 08/791,437, filed Jan. 27, 1997, now U.S. Pat. No. 6,449,344, the entirety of which is incorporated herein by reference.

FIELD OF THE INVENTION

The present invention relates to communications systems generally and particularly to network communications systems.

BACKGROUND OF THE INVENTION

Establishing a point-to-point connection between users who are connected via communications terminals to a communications network generally requires that the network address of each connecting user be known to all other connecting users. Many network communications service providers, such as Internet Service Providers (ISP's), assign users a different network address, such as an IP address, each time they connect to the network, making foreknowledge of a particular user's network address impossible.

Some commercial and non-commercial services maintain network servers connected to a network. Users who connect to the network provide their current network address and other identifying information to one or more of these network servers. This information is made available to other users connected to the network for purposes including point-to-point communications. Such services include Internet Relay Chat (IRC), for which software is commercially available from Surfing Squirrel Productions, Inc., Microsoft User Location Service (ULS), commercially available from Microsoft Corporation, and the Automatic Call Distribution System (ACD), commercially available from Executone Information Systems, Inc.

A user wishing to locate another user may connect to a network server that records user information in order to determine the other user's network address. A user usually locates another user by looking for the other user's electronic mail address, one or more nicknames that the other user often uses, or other identifying information. The effective use of such identifying information is limited inasmuch as a single user might have multiple electronic mail addresses, multiple users might use the same nickname, or a user might be connected via another user's network connection.

Unfortunately, services like those mentioned above do not generally provide for the unique identification of each user, thereby facilitating accurate location of a specific user. Furthermore, such services require that users actively seek out other users, often from among several hundreds of thousands of users known to a server to be connected to a network at any given time. Such services also do not enable a user to limit who may access that user's identification information.

SUMMARY OF THE INVENTION

The present invention seeks to provide an improved communications system for facilitating locating a user who is connected to a communications network, preferably for the purposes of establishing point-to-point communications. A user's location on a communications network is typically expressed in terms of the user's current network address.

The communications system of the present invention preferably provides at least some and preferably all of the following advantages:

a. Users may be located accurately, because each user has a permanent and unique identification code.
b. Users may be located quickly and efficiently, because the network server automatically provides a user who is currently connected to the network with a list of other users who are currently connected to the network from among a predefined list of users whose connection status the user wishes to know.
c. Users are notified automatically when another user, in whom the seeking user has interest, connects to the network.
d. Users may protect their privacy by limiting who may locate them.

It is noted that throughout the specification and claims the term "user" encompasses any entity, preferably human, that operates a computer or other communications terminal, preferably for the purpose of connecting to and communicating via a communications network. It is further noted that the term "seeking user" encompasses any user who wishes to locate at least one other user currently connected to the communications network. It is further noted that the term "sought user" encompasses any user whose location, typically a network address, is desired by a seeking user.

There is thus provided in accordance with a preferred embodiment of the present invention a communication system including a communications network, a multiplicity of communications terminals which are connectable to the communications network and which can be employed by users to communicate via the communications network, the user not necessarily being identified with a given communications terminal, apparatus for monitoring whether or not a user is connected to the communications network irrespective of which of the multiplicity of communications terminals that user is employing, and apparatus for annunciating to a seeking user, currently connected to the communications network via any of the multiplicity of communications terminals, network connection status information relating to other users who are in a set of sought users, which set is definable by the seeking user, and for providing the seeking user connection address information relating to those sought users who are currently connected to the communications network.

Further in accordance with a preferred embodiment of the present invention, any of the users may function as at least one of a seeking user and a sought user.

Still further in accordance with a preferred embodiment of the present invention, any of the users may function simultaneously as a seeking user and a sought user.

Further in accordance with a preferred embodiment of the present invention, the network connection status information includes an indication that a sought user is currently connected to the communications network.

Additionally in accordance with a preferred embodiment of the present invention, the network connection status information includes an indication that a sought user has currently become connected to the communications network.

Moreover in accordance with a preferred embodiment of the present invention, the network connection status information includes an indication that a sought user has currently become disconnected from the communications network.

Further in accordance with a preferred embodiment of the present invention, at least one of the users has a unique identification code.

Still further in accordance with a preferred embodiment of the present invention, the unique identification code is independent of any communications terminal.

Additionally in accordance with a preferred embodiment of the present invention, at least one server is connected to the communications network, and the apparatus for monitoring is resident in the at least one server.

Further in accordance with a preferred embodiment of the present invention, at least one server is connected to the communications network, and the apparatus for annunciating is resident in the at least one server.

Moreover in accordance with a preferred embodiment of the present invention, the communications system includes apparatus for notifying at least once that at least one of the users is currently connected to the communications network.

Further in accordance with a preferred embodiment of the present invention, the apparatus for notifying is resident in any of the multiplicity of communications terminals.

Still further in accordance with a preferred embodiment of the present invention, at least one of the users is currently connected to the communications network and has a network address, and the communications system includes apparatus for determining the network address.

Additionally in accordance with a preferred embodiment of the present invention, at least one server is connected to the communications network, and the apparatus for determining is resident in the at least one server.

Moreover in accordance with a preferred embodiment of the present invention, the apparatus for determining is resident in any of the multiplicity of communications terminals.

Further in accordance with a preferred embodiment of the present invention, the communication system includes apparatus for authorizing whether the at least one seeking user may access any of the information relating to the sought users.

Still further in accordance with a preferred embodiment of the present invention, the apparatus for authorizing is resident in any of the multiplicity of communications terminals.

Additionally in accordance with a preferred embodiment of the present invention, the communication system includes apparatus for maintaining information regarding any of the users.

Moreover in accordance with a preferred embodiment of the present invention, the apparatus for maintaining information is resident in at least one server connected to the communications network.

Further in accordance with a preferred embodiment of the present invention, at least one of the users provides information to the apparatus for maintaining information.

Still further in accordance with a preferred embodiment of the present invention, the information includes the set of sought users.

Additionally in accordance with a preferred embodiment of the present invention, the information comprises a request from a sought user to authorize whether a seeking user may access any of the information relating to the sought user.

There is also provided in accordance with a preferred embodiment of the present invention a method for indicating network connection information relating to users, the method including monitoring whether or not a user is connected to a communications network via any of a multiplicity of communications terminals, and annunciating to a seeking user, currently connected to the communications network via any of the multiplicity of communications terminals, network connection status information relating to other users who are in a set of sought users, which set is definable by the seeking user, and for providing the seeking user connection address information relating to those sought users who are currently connected to the communications network.

Further in accordance with a preferred embodiment of the present invention, at least one of the users has a unique identification code.

Still further in accordance with a preferred embodiment of the present invention, the unique identification code is independent of any communications terminal.

BRIEF DESCRIPTION OF THE DRAWINGS

The present invention will be understood and appreciated more fully from the following detailed description, taken in conjunction with the drawings in which.

Attached herewith is a microfiche appendix comprising appendices A and B which aid in the understanding and appreciation of one preferred embodiment of the invention shown and described herein. Appendices A and B taken together form a computer listing of a preferred software embodiment of the present invention.

DETAILED DESCRIPTION OF PREFERRED EMBODIMENTS

Figure 1:
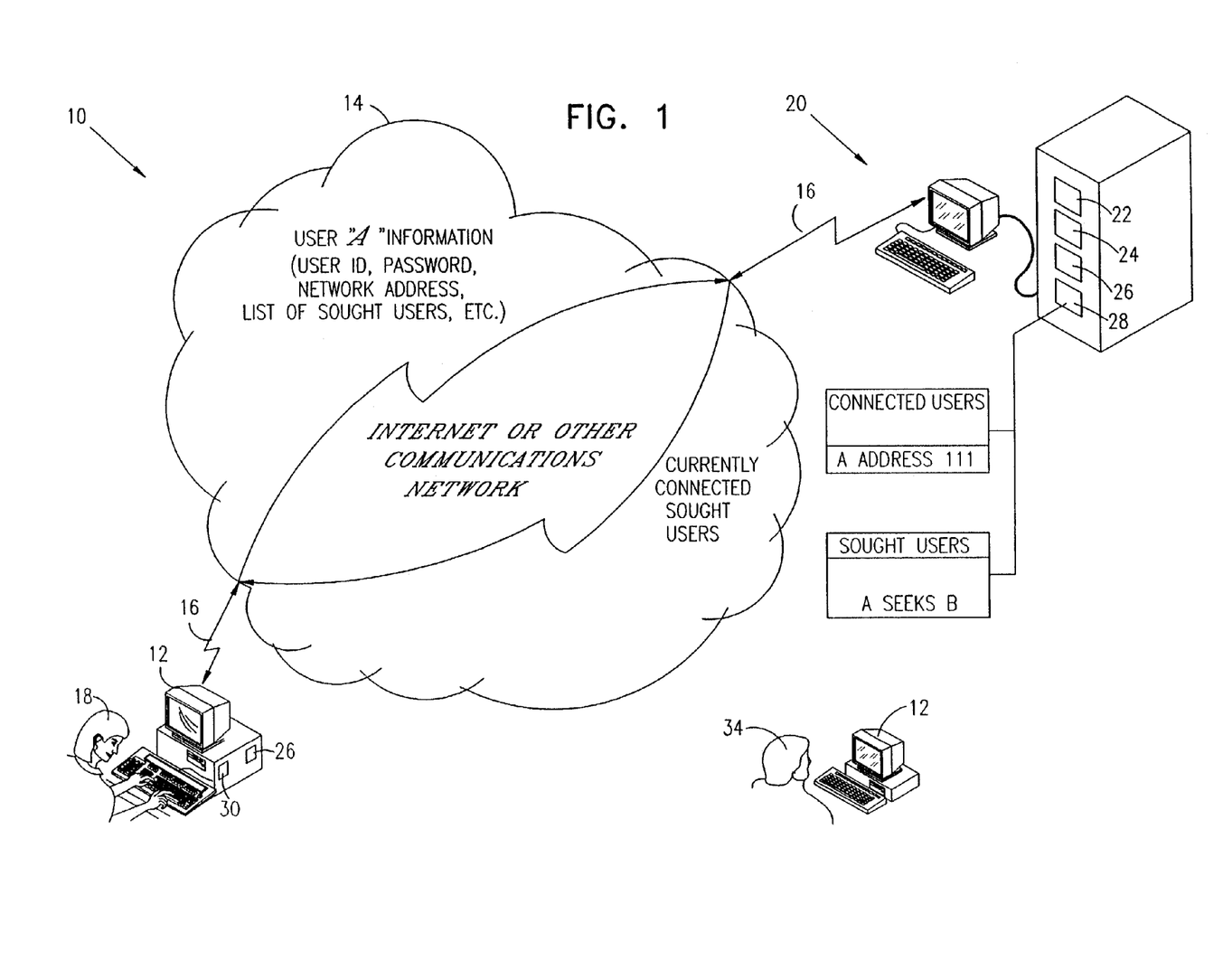
FIG. 1 is a simplified pictorial illustration of a communications system constructed and operative in accordance with a preferred embodiment of the present invention, wherein a user is connecting to a communications network via a communications terminal and user information is provided to a server connected to the communications network.

Reference is now made to FIG. 1 which is a simplified pictorial illustration of a communications system 10 constructed and operative in accordance with a preferred embodiment of the present invention.

Communications system 10 preferably includes a multiplicity of communications terminals 12 connectable to a communications network 14 via a multiplicity of connection media 16, which may either be wired or wireless. Communications terminals 12 are preferably operative to receive inputs from and display information to a user 18, and to transmit and receive information via communications network 14 to and from at least one server 20 that is also connected to communications network 14 via connection media 16. Server 20 is likewise operative to send and receive information via communications network 14.

Connection notification apparatus 30 is operative to receive input from communications terminal 12, in which connection notification apparatus 30 is typically resident. Communications terminal 12 signals connection notification apparatus 30 when communications terminal 12 connects to communications network 14. Connection notification apparatus 30 preferably transmits notification via communications network 14 to a connection monitor 22, which is operative to receive input via communications network 14, and which is typically resident in server 20. An address extractor 26, typically resident in server 20, is operative to determine the source network address of the notification received by connection monitor 22, to which address extractor 26 is operatively interconnected. Address extractor 26 is operative to provide the network address to information management apparatus 28, typically resident in server 20, where the address is maintained. Address extractor 26 is alternatively or additionally operative to communicate with communications terminal 12, in which address extractor 26 may alternatively or additionally reside, where address extractor 26 is operative to determine the network address of connection terminal 12 when a connection to communications network 14 is established, and to provide the network address to connection notification apparatus 30.

An annunciator 24, typically resident in server 20, is operative to receive information maintained by information management apparatus 28 and transmit this information to communications terminal 12.

Typical operation of communications system 10 is described in detail below with reference to FIGS. 1, 2, and 3.

Reference is now made to FIG. 1 which shows a user 18 establishing a connection to communications network 14, typically the Internet, using a communications terminal 12 via connection medium 16. The connection to communications network 14 is typically via a leased line or dial-up line to a network communications service provider, typically an Internet Service Provider (ISP).

At least one server 20 is typically continually connected to the communications network 14 via connection medium 16. More than one server 20 may be provided wherein all servers are preferably continually synchronized to maintain and supply the same information.

Once user 18 is connected to communications network 14, connection notification apparatus 30 notifies connection monitor 22 that user 18 is connected to communications network 14. This notification preferably includes a unique identification code predefined for user 18 and maintained in a list of connected users by information management apparatus 28. This unique identification code is preferably independent of the communications terminal 12 used by user 18. Preferably, this notification also comprises a user password for authentication of the unique identification code. This notification may also include other information such as the current network address for user 18.

Address extractor 26 preferably determines the current network address of user 18 when the user is connected to communications terminal 12. Address extractor 26 is preferably operative to extract a network address from transmission packets used in network data transmission protocols such as TCP/IP. Thus address extractor 26 may extract the current network address of user 18 from transmission packets sent by connection notification apparatus 30 to connection monitor 22. Address extractor 26 then provides the current network address for user 18 to information management apparatus 28 which maintains the address in the list of connected users.

While address extractor 26 typically communicates with information management apparatus 28 as mentioned above, address extractor 26 may alternatively or additionally communicate with communications terminal 12, providing the current network address to connection notification apparatus 30. Connection notification apparatus 30 then transmits the network address to connection monitor 22, which provides the address to information management apparatus 28 which maintains the address in the list of connected users.

Communications terminal 12 preferably provides a list of sought users predefined by user 18 to information management apparatus 28 which maintains it. Communications terminal 12 may also provide instructions from user 18 to information management apparatus 28 regarding whether user 18 requests to be asked to explicitly authorize whether to reveal information relating to user 13 to a seeking user who requests this information. Information management apparatus 28 maintains a list of users who request to be asked for authorization.

Information management apparatus 28, upon receipt of a list of sought users from user 18 at communications terminal 12, checks the list of connected users for any sought users that are currently connected to communications network 14, typically for display on the terminal. If connected sought users are found, information management apparatus 28 causes annunciator 24 to transmit an annunciation to user 18 at communications terminal 12 wherein the annunciation typically includes the unique identification codes and network addresses for all users who are currently connected to communications network 14 and who user 18 is seeking.

Connection monitor 22 periodically polls communications terminal 12 or otherwise determines if communications terminal 12 is still connected to communications network 14 in accordance with network communications protocols well known in the art, such as TCP/IP. Alternatively or additionally, connection notification apparatus 30 periodically notifies connection monitor 22 that communications terminal 12 is still connected to communications network 14 in accordance with network communications protocols well known in the art, such as TCP/IP.

Figure 2:
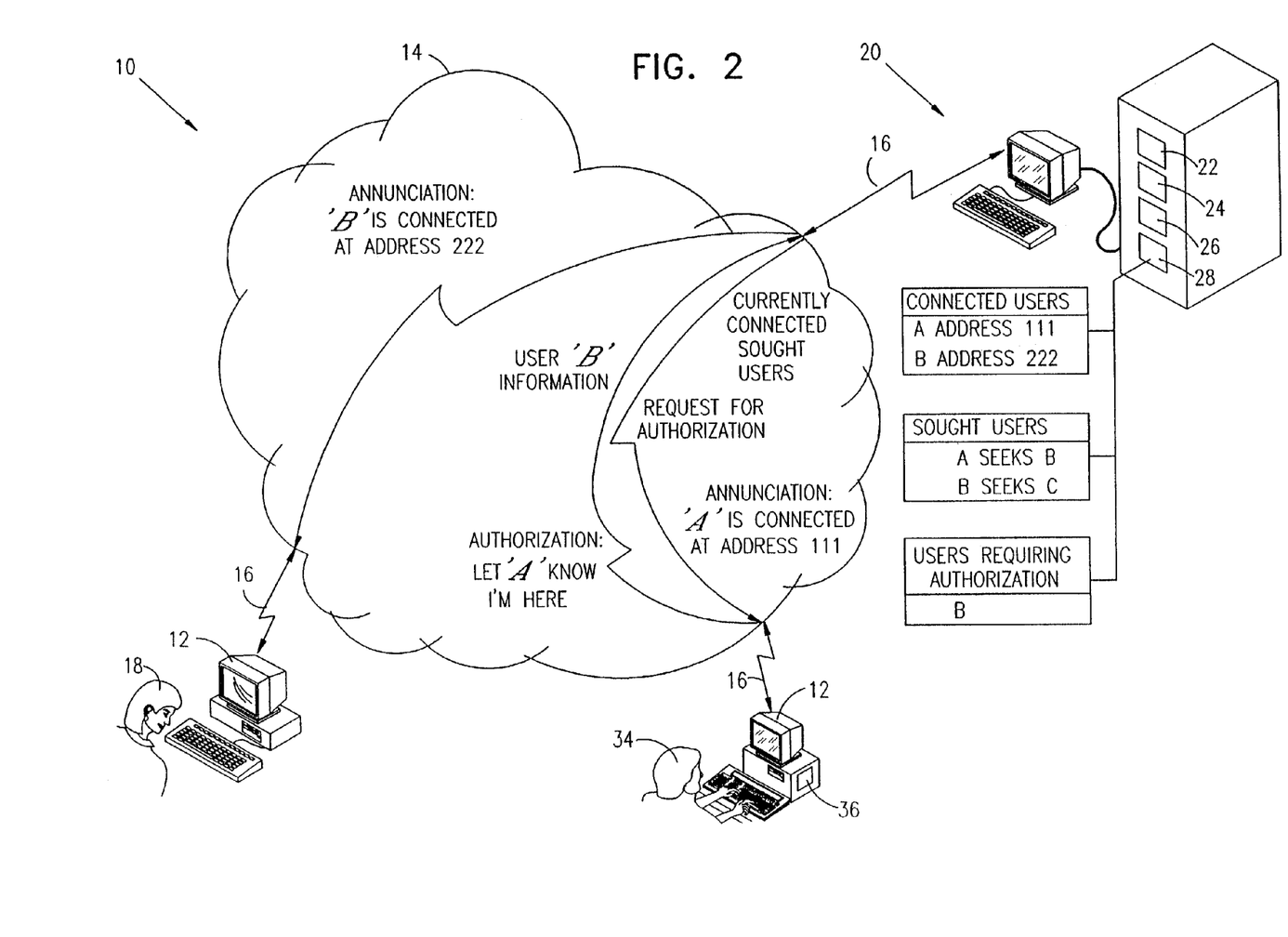
FIG. 2 is a simplified pictorial illustration of a communications system constructed and operative in accordance with a preferred embodiment of the present invention, wherein a sought user is connecting to the communications network of FIG. 1, information identifying the sought user is provided to the server of FIG. 1, and wherein the server of FIG. 1 communicates information identifying the sought user to the user of FIG. 1.

Reference is now made to FIG. 2 which shows a user 34 establishing a connection to communications network 14 preferably in the same manner as described for user 18 in FIG. 1. Once user 34 is connected, information management apparatus 28 checks the list of sought users to determine if user 34 is sought by user 18. If so, information management apparatus 28 then checks the list of connected users to determine if user 18 is still connected. If user 18 is still connected, information management apparatus 28 causes annunciator 24 to transmit an annunciation to user 18, wherein the annunciation typically includes the unique identification code for sought user 34, the current network address for sought user 34, and preferably other information provided by user 18. Information management apparatus 28 preferably also checks the list of sought users to determine if user 18 is sought by user 34 and, if so, causes annunciator 24 to transmit an annunciation to user 34 as described above.

According to another embodiment of the present invention information management apparatus 28 checks the list of users who wish to be asked for authorization to determine if user 34 wishes to explicitly authorize requests from seeking users for information regarding user 34. If explicit authorization is required from user 34, annunciator 24 transmits a request for authorization to authorization apparatus 36, typically resident in communications terminal 12. User 34 authorizes or declines the request from user 18 for location or other information relating to user 34. Authorization apparatus 36 then provides the authorization information to information management apparatus 28 which determines whether to cause annunciator 24 to transmit an annunciation to user 18.

Figure 3:
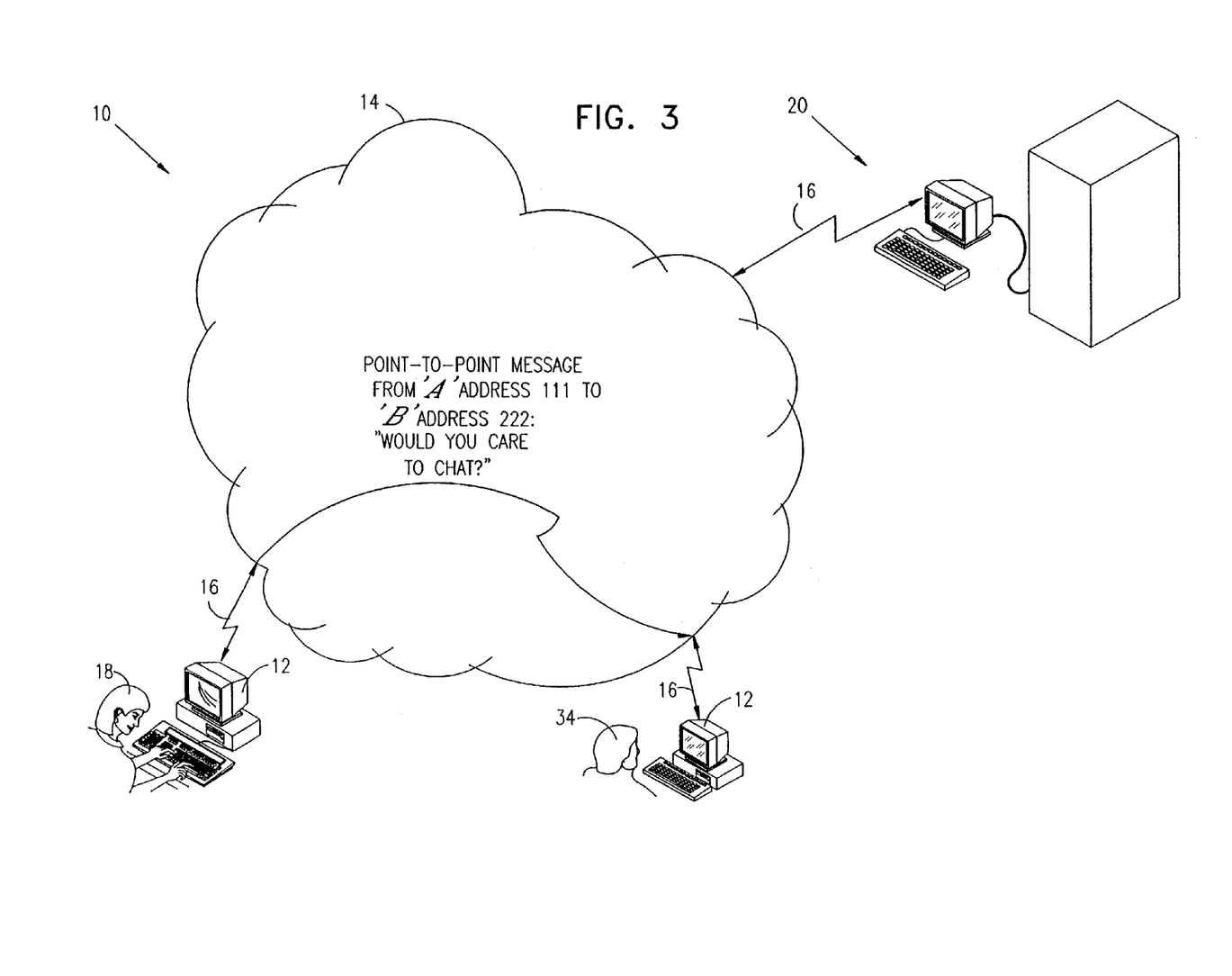
FIG. 3 is a simplified pictorial illustration of a communications system constructed and operative in accordance with a preferred embodiment of the present invention, wherein the user of FIG. 1 communicates directly with the sought user of FIG. 2, having received the sought user's network address.

Reference is now made to FIG. 3 which shows user 18 making a point-to-point connection with sought user 34 using the network address of sought user 34 as provided by annunciator 24 as described above with reference to FIGS. 1 and 2. It is appreciated that user 18 may establish a point-to-point connection with user 34 once user 18 possesses the network address of user 34 independent of the present invention.

A preferred method for constructing a communications system operative in accordance with a preferred embodiment of the present invention is now described:

a) Construct a communications network such as a LAN (local-area network) or a WAN (wide-are network) using a network protocol such as TCP/IP or IPX/SPX, or provide access to a communications network such as the Internet;

b) Connect a communications terminal, such as an Intel-based computer using the Microsoft Windows 95 operating system, to the communications network;

c) Connect a server, such as an Intel-based computer operating the Linux operating system, to the communications network;

d) Generate executable instructions from the computer listing of Appendix A, which is a computer listing of software components typically resident on communications terminal 12 as described above with reference to FIG. 1, and the computer listing of Appendix B, which is a computer listing of software components typically resident on server 20 as described above with reference to FIG. 1;

e) Load the executable instructions of Appendix A into the communications terminal memory and execute them; and f) Load the executable instructions of Appendix B into the server memory and execute them.

It is appreciated that any of the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination.

It will be appreciated by persons skilled in the art that the present invention is not limited by what has been particularly shown and described hereinabove. Rather the scope of the present invention is defined only by the claims which follow:

The invention claimed is:

1. A communications system comprising:
   a communications network;
   a multiplicity of communications terminals which are connectable to said communications network and which can be employed by a plurality of users to communicate via said communications network, wherein a given user of said plurality of users is not necessarily identified with a given communications terminal;
   apparatus for monitoring whether or not a specific user of said plurality of users is connected to said communications network irrespective of which of said multiplicity of communications terminals said specific user is employing; and
   apparatus for annunciating to at least one seeking user of said plurality of users, currently connected to said communications network via any of said multiplicity of communications terminals, network connection status information relating to at least one other user who is in a set of sought users, said set of sought users being definable by said at least one seeking user, and for providing to said at least one seeking user connection address information relating to said at least one other user when said at least one other user is connected to said communications network.

2. A communications system according to claim 1 and comprising apparatus for maintaining information regarding any of said plurality of users.

3. A communications system according to claim 2 and wherein said apparatus for maintaining information is resident in at least one server connected to said communications network.

4. A communications system according to claim 2 and wherein at least one of said plurality of users provides information to said apparatus for maintaining information.

5. A communications system according to claim 2 and wherein said information comprises said set of sought users.

6. A communications system according to claim 2 and wherein said information comprises a request from said at least one other user to authorize whether said at least one seeking user may access any of said information relating to said at least one other user.

7. A communications system according to claim 1 wherein at least one of said plurality of users is currently connected to said communications network and has a network address, and comprising apparatus for determining said network address.

8. A communications system according to claim 7 wherein at least one server is connected to said communications network and wherein said apparatus for determining said network address is resident in said at least one server.

9. A communications system according to claim 7 and wherein said apparatus for determining said network address is resident in any of said multiplicity of communications terminals.

10. A communications system according to claim 1 and wherein at least one of said plurality of users has a unique identification code.

11. A communications system according to claim 10 and wherein said unique identification code is independent of any communications terminal.

12. A communications system according to claim 1 and comprising apparatus for authorizing whether said at least one seeking user may access any of said information relating to said at least one other user.

13. A communications system according to claim 12 and wherein said apparatus for authorizing is resident in any of said multiplicity of communications terminals.

14. A communications system according to claim 1 and wherein any of said plurality of users may function as at least one of said at least one seeking user and said at least one other user.

15. A communications system according to claim 1 and wherein any of said of users may function simultaneously as said at least one seeking user and said at least one other user.

16. A communications system according to claim 1 and wherein said network connection status information includes an indication that said at least one other user is currently connected to the communications network.

17. A communications system according to claim 1 and wherein said network connection status information includes an indication that said at least one other user has currently become connected to the communications network.

18. A communications system according to claim 1 and wherein said network connection status information includes an indication that said at least one other user has currently become disconnected from the communications network.

19. A communications system according to claim 1 wherein at least one server is connected to said communications network and wherein said apparatus for monitoring is resident in said at least one server.

20. A communications system according to claim 1 wherein at least one server is connected to said communications network and wherein said apparatus for annunciating is resident in said at least one server.

21. A communications system according to claim 1 and comprising apparatus for notifying at least once that at least one of said plurality of users is currently connected to said communications network.

22. A communications system according to claim 21 and wherein said apparatus for notifying is resident in any of said multiplicity of communications terminals.

23. A method for indicating network connection information relating to a plurality of users, the method comprising:

monitoring whether or not a specific user of said plurality of users is connected to a communications network via any of a multiplicity of communications terminals irrespective of which of said multiplicity of communications terminals said specific user is employing;

annunciating to at least one seeking user of said plurality of users, currently connected to said communications network via any of said multiplicity of communications terminals, network connection status information relating to at least one other user who is in a set of sought users, said set of sought users being definable by said at least one seeking user; and providing to said at least one seeking user connection address information relating to said at least one other user when said at least one other user is connected to said communications network.

24. A method according to claim 23 wherein at least one of said plurality of users has a unique identification code.

25. A method according to claim 24 wherein said unique identification code is independent of any communications terminal.

* * * * *

UNITED STATES PATENT AND TRADEMARK OFFICE
CERTIFICATE OF CORRECTION

| | | |
|---|---|---|
| PATENT NO. | : 7,149,775 B2 | Page 1 of 1 |
| APPLICATION NO. | : 10/127463 | |
| DATED | : December 12, 2006 | |
| INVENTOR(S) | : Goldfinger et al. | |

It is certified that error appears in the above-identified patent and that said Letters Patent is hereby corrected as shown below:

On the Title Page of the patent, please add the following:

(30)  Foreign Application Priority Data

October 6, 1996 (IL)..........................119364

Signed and Sealed this

Twenty-second Day of May, 2007

JON W. DUDAS
*Director of the United States Patent and Trademark Office*